United States Patent Office 3,769,348
Patented Oct. 30, 1973

3,769,348
NOVEL SYNTHETIC MUSK ODORANTS
Thomas F. Wood, Wayne, and Emanual Heilweil, Passaic, N.J., assignors to Givaudan Corporation, Clifton, N.J.
No Drawing. Filed Mar. 25, 1970, Ser. No. 22,664
Int. Cl. A61k 7/00; C07c 14/76
U.S. Cl. 260—590                                                         3 Claims

ABSTRACT OF THE DISCLOSURE

There are provided novel tricyclic carbocyclic compounds containing a total of 20 carbon atoms which are odorants of the musk type. These compounds possess all of the desirable properties of natural musks while possessing greater tenacity. The novel compounds may be synthesized at a small fraction of the cost of the market price of the natural odorants.

BACKGROUND OF THE INVENTION

Field of the invention

Novel synthetic odorants of the musk type.

DESCRIPTION OF THE PRIOR ART

Natural musk, of which "Tonkin musk" is the most esteemed variety, is derived from the Asian Musk deer. This natural musk is an indispensable component of high class perfumes. It possesses a combination of two nuances, namely a sweet musk odor and a sweaty animal odor. Strange though it may seem to the layman, this latter quality is highly desirable. The combination of the nature and location of the source makes this substance very costly and its supply uncertain.

The search for synthetic substitutes has continued for more than 80 years, since the surprising discovery by Baur that the odor of natural musk is imitated in certain nitrated derivatives of benzene. Stoll reported in 1937 that certain ketones, macrocyclic in structure, containing 15–19 carbon atoms exhibit musk-like properties (Mfg. Perfumer 1, 107–8 (1937)). In a more recent study by Beets (Structure and Odour, p. 83, Molecular Structure and Organoleptic Quality, S.C.I. Monograph #1, 1957) it was concluded that the aromatic polycyclic compounds which possess musk odorant qualities should contain more than 14 and less than 20 carbon atoms, optimally 16–18 carbon atoms. In a latter paper, the same author, (Beets, La France & ses Parfums X, 113–122 at 115 (1967)) amplified this conclusion to include musk odorants of molecular weight between 216 and 286. The latter ($C_{20}H_{30}O$) and the former were both characterized as substantially odorless. This position was supported by a study by Theimer and Davies (Agr. and Food Chemistry, 15, 6–19 (1967)) who found good musk odorants in the $C_{17}$–$C_{18}$ range but none above $C_{19}$. Wood et al. (J. Org. Chem., 28 2248 (1963)) reported two $C_{20}$ compounds as having weak musk odors. Subsequent work showed that these substances were odorless in the highly purified state. U.S. Patent 2,815,382 described, inter alia a $C_{20}$ polycyclic aromatic compound having musk properties. This compound, however, does not possess the unexpected odorant properties of the compounds of this invention and cannot act as a replacement for natural musk.

The prior art, therefore, discourages the possibility of finding musks having 20 carbon atoms.

SUMMARY OF THE INVENTION

It has been our surprising finding that the $C_{20}$ compounds of the present invention not only possess strong musk properties but are superior in odorant quality and tenacity to natural Tonkin musk as will appear hereinbelow.

The novel compounds of the present invention have the following structure:

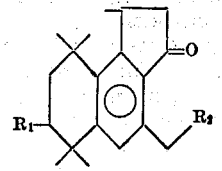

wherein $R_1$ and $R_2$ are hydrogen or methyl, provided that when $R_1$ is hydrogen, $R_2$ is methyl and when $R_1$ is methyl, $R_2$ is hydrogen.

The novel compounds of the present invention are produced in two steps—the first involves acylation of the corresponding tetrahydronaphthalene with a crotonylating agent or its equivalent in the presence of a Lewis acid in a suitable solvent; the second involves cyclization, as shown in the following sequence:

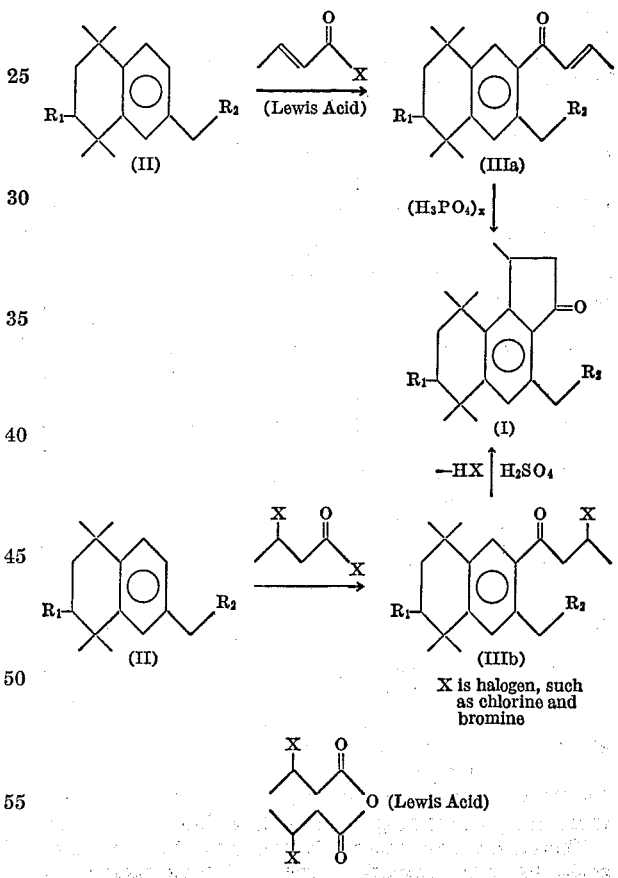

X is halogen, such as chlorine and bromine

In the first sequence shown above a crotonyl halide is employed as the acylating agent while in the second its equivalents, a β-halobutyryl halide or a β-halobutyryl anhydride, are shown leading to the respective intermediates III–a and III–b.

Either of the intermediates III–a or III–b will yield the desired product I when cyclized by treatment with concentrated sulfuric acid, polyphosphoric acid, or other suitable cyclizing agent. While we do not wish to be bound to the thesis, it is believed that in the course of the cyclization step both III–a and III–b pass through a common carbonium ion intermediate.

DESCRIPTION OF THE PREFERRED EMBODIMENTS

The process of the present invention involves two steps: an acylation step, comprising crotonylation, or its chemical equivalent, and a cyclization step. By chemical equivalent of crotonylation is meant β-halobutyrylation for the purpose of the invention.

As crotonylating agents may be employed crotonyl halides such as crotonyl chloride or crotonyl bromide. As equivalent acylating agents may be employed β-halobutyryl halides such as β-chlorobutyryl chloride, β-bromobutyryl bromide, β-bromobutyryl chloride, β-chlorobutyryl bromide, β-halobutyryl anhydrides such as β-bromobutyryl anhydride, β-chlorobutyryl anhydride, or the like. For the reasons of cost crotonyl bromide or chloride are preferred.

The Lewis acid catalysts employed include aluminum chloride, aluminum iodide, ferric chloride, ferric bromide, antimonypentachloride, titanium tetrachloride, stannic chloride, zinc chloride, zirconium tetrachloride and the like. Of these aluminum chloride is preferred not only because of superior results but also due to its ready availability in high purity.

As solvents there may be used any of the conventional Friedel-Crafts solvents such as carbon tetrachloride, methylene dichloride or ethylene dichloride. Also suitable as solvents are carbon disulfide, petroleum ether, nitrobenzene or nitromethane.

In view of the intense activity of aluminum chloride where this reagent is used as the Lewis acid, it is especially preferred to utilize a preformed complex of the crotonylhalide with the aluminum chloride in one of the first group of solvents. The use of ethylene dichloride is especially preferred.

In this particular modification a complex is prepared containing between 1.15–1.2 moles of the crotonylating agent to between 1 and 1.15 moles of aluminum chloride, per mole of hydrocarbon to be added. While these ratios are not critical, ratios of aluminum chloride to crotonylating agent of at least 1:1 preferably biased in favor of excess acylating agent are desirable. An excess of the hydrocarbon (II) to be reacted may be used as solvent. However, more efficient results are obtained using the above-named solvents as solvents.

In the preferred modification 1 mole of the hydrocarbon (II) is added dropwise to the above-mentioned complex over a time of 2–4 hrs. at a temperature in the region of 0° C.

Reaction time may lie between 1 and 10 hours, preferably 3–4 hours at temperatures between −5° and +5° C.

In an alternate specific modification of the process, a mixture of 1 mole hydrocarbon (II) and 1.15–1.2 moles of crotonyl chloride are added dropwise to a suspension of about 1 to 1.5 moles of ground aluminum chloride in the solvent at a temperature of about 15°–30°, preferably 20–25° C. over about one hour. The reaction proceeds in this temperature range over 1–10, preferably 3–4 hours.

This alternate modification is utilized for the other Lewis acids. Reaction quantities, times and temperatures are similar to those set forth above.

In both of the above modifications, the reaction mixture is quenched after completion of the reaction and worked up in the usual manner to isolate the product.

The cyclization of the crotonyl (IIIb) or β-halobutyryl derivaties (IIIa) is then effected.

Among the preferred cyclizing agents may be mentioned aluminum chloride, strong sulfuric acid, hydrofluoric acid (substantially anhydrous), and polyphosphoric acid. Where the derivative is a β-halobutyryl derivative it is preferred to use 93% sulfuric acid. There are utilized between 10 and 50, preferably 30 moles of acid per mole of ketone (III-a or III-b).

The ketone and the acid are vigorously agitated and heated to from about 60° to about 80° C., preferably to about 70° C. for from about 1 to about 4 hours, preferably for about 2 hours.

Where aluminum chloride is utilized as the cyclizing agent, the reaction may suitable be carried out at ambient temperature or slightly above ambient temperature, say between about 15° and 30° C. The use of one of the solvents named in the previous step for use with this reagent has been found to facilitate reaction.

The crotonyl derivatives are, desirably, cyclizing using either substantially anhydrous liquid hydrogen fluoride, or polyphosphoric acid. While both reagents are satisfactory, the polyphosphoric acid is generally preferred for ease of handling.

In the cyclization reaction, there are used between 5 and 50 moles, preferably about 40 moles of polyphosphoric acid per mole of ketone (III) (a or b) at a temperature of between 70° and 130° C., preferably at about 105° C. for from about 0.25 to about 1.5 hours, suitably about 0.5 hours.

Hydrogen fluoride should be used as the cyclizing agent in metal equipment and is effective in the ratio of 5–10 moles per mole of ketone, there being no especially preferred ratio within this range. Despite problems of handling, it is particularly a desirable feature of hydrogen fluoride that the cyclization reaction can take place at ambient temperatures, reaction being complete in between about 2 and about 6 hours, suitably in about 4 hours at such temperatures.

After the reaction with the cyclizing agent is complete, the product is isolated. Suitably, the reaction mixture is quenched in ice and the product extracted with a suitable water-immiscible solvent such as toluene or the like. The extract is washed to neutrality, the solvent evaporated, preferably under reduced pressure, and the residual product purified by distillation under reduced pressure. Ultimate purification is achieved by crystallization from a polar solvent, a lower alkanol, such as ethanol being especially suitable.

The compounds of the present invention show very desirable properties when compared with natural Tonkin musk.

The tricyclic ketones (I) of the present invention have been compounded in ethanolic solutions. 15 μl of ethanolic solutions containing 2.7% each of these compounds have been allowed to evaporate on smelling blotters over six weeks at room temperature. Similar amounts of 3.0% natural musk tincture (ethanolic solution) were allowed to evaporate under similar conditions at the same time.

The natural musk had a strong initial odor, but after about two weeks the true musk odor had disappeared leaving the desirable sweaty-urinaceous odor which itself disappeared after a further two weeks.

The synthetic musks of the present invention, however, maintained both of the desirable odorant notes (the musk odor and the sweaty animal odor) in substantially equal strength for about 6 weeks.

This characteristic of slow evaporation with maintenance of uniform quality of odor is both desirable and surprising.

The compounds of the present invention were found to exhibit three times the enacity of a synthetic musk well known in the art, namely 7-acetyl-1,1,3,4,4,6-hexamethyl-1,2,3,4-tetrahydronaphthalene. 15 μl of solutions containing 3.0% of the musk odorants were allowed to evaporate on smelling blotters at room temperature for six weeks. After two weeks the prior art synthetic musk had disappeared while the compounds of the present invention were detectable for six weeks.

This desirable property of tenacity has the effect of maintaining a desired odor for three times as long as was possible using prior art musks in say, sachets, area odorants, soaps and the like.

TENACITY TEST FORMULATION

The odorant formulation base employed in the aforementioned tenacity tests had the following composition:

| | Parts |
|---|---|
| 1,4,6,6,7,9,9 - heptamethyl - 1,2,6,7,8,9 - hexahydro-3H-benz(e)inden-3-one, or 4-ethyl-1,6,6,9,9-pentamethyl-1,2,6,7,8,9-hexahydro - 3H-benz(e)inden-3-one | 543 |
| P-cresylphenyl acetate | 403 |
| Castorium liquid | 27 |
| Tobacco absolute | 18 |
| Costus oil | 9 |
| | 1000 |

As used in the tests, the resulting composition was diluted by mixing 5 parts of it with 95 parts of ethanol.

When used in concentrations of between 0.1% to 25% by weight, suitably about 2% by weight, the novel musks of the present invention impart a highly desirable body and warmth to cologne formulations. When utilized in concentrations of greater than 25%, indeed up to 60% by weight, special effects may be obtained. Among these may be mentioned musk-wood bases in which the novel musks create a highly desirable odor balance and sweet characteristic.

EXAMPLE I 1,4,6,7,9,9-heptamethyl-1,2,6,7,8,9-hexahydro-3H-benz(e)inden-3-one (a) Crotonyl chloride (126 g.) (1.2 moles) is added over a period of 15 minutes to a suspension of 140 g. (1.05 moles) of anhydrous aluminum chloride in 450 ml. of ethylene chloride at 0°. Then 216 g. (1 mole) of 1,1,3,4,4,6-hexamethyl - 1,2,3,4 - tetrahydronaphthalene in 250 ml. of ethylene dichloride is added during the course of 1.5 hours at 0° to −5°. Stirring is continued for 2 hours after the addition. The solution is quenched on ice and hydrochloric acid solution and the resulting ethylene dichloride solution separated and washed with water and sodium bicarbonate solution until neutrality.

The extract is filtered and distilled. After removal of solvent the residual oil is vacuum-distilled to yield an oil (166.5 g.), B.P. 147–152° (1 mm.), $n_D^{20}$ 1.5462. Recrystallization from ethanol gave 7-crotonyl-1,1,3,4,4,6-hexamethyl-1,2,3,4-tetrahydronaphthalene (114 g.), m.p. 53–54.5°. Calc. for $C_{20}H_{28}O$: C, 84.45; H, 9.92. Found: C, 85.09; H, 9.85.

(b) Seventy-three (73) grams of the above product are cyclized by heating in the presence of 800 g. of polyphosphoric acid first at 70° and finally at 105° over a 30 minute period. The batch is stirred and allowed to cool to 80° over a period of 20 minutes. After quenching in ice, the product is extracted with toluene. The solution is washed to neutrality sequentially with water and with 10% $NaHCO_3$ solution. The solvent is removed by distillation and the residual oil vacuum-distilled (B.P. 169–175° at 1.5 mm.) to yield an oil (56 g.). This oil is crystallized from ethanol to yield the desired 1,4,6,6,7,9,9 - heptamethyl - 1,2,6,7,8,9 - hexahydro - 3H - benz(e)indene-3-one (20.5 g.), double M.P. 98.5–99° C./103–104.5° C., having a strong musk-like odor. Cal for $C_{20}H_{28}O$: C, 84.45; H, 9.92. Found: C, 84.66; H, 10.00. Mass spec. M.W.: 284 (parent peak). N.M.R. analysis shows the following peaks:

| Multiplicity: | Tau values |
|---|---|
| doublet $CH_3CHCH_2$ | 9.00 |
| doublet $CH_3$—C—$\phi$ | 8.70 |
| 4-singlets (methyls) | 8.82, 8.70, 8.65, 8.45 |
| broad multiplet | 8.15 |
| singlet $CH_3$ | 7.40 |
| doublet | 7.70 |
| multiplet (doublet of doublets) $CH_2C$=O | 7.20 |
| multiplet HC—$CH_3$ | 6.20 |
| singlet $\phi$—H | 2.82 |

The infrared spectrum shows the following characteristic bands (KBr pellet, ca. 0.1 mm.): 3.26 mw., 3.34 s., 3.38 s., 3.44 s., 3.46 s., 3.53 s., 5.88 s., 5.92 s., 6.08 m., 6.39 s., 6.27 m., 6.85 s., 6.95 ms., 7.22 m., 7.30 s., 7.35 s., 7.65 ms., 7.70 ms., 7.88 ms., 7.95 ms., 8.00 s., 8.12 s., 8.55 mw., 8.78 ms., 8.92 s., 9.25 ms., 9.35 m., 9.45 m., 9.65 m., 9.90 ms., 10.00 m., 10.20 m., 10.60 w., 10.95 m., 11.05 m., 11.42 ms., 11.60 mw., 12.64 mw., 13.55 w., 14.50 m., 14.75 mw., 15.65 m., 16.30 w., 17.40 w., 18.00 w., 18.55 mw., 19.00 mw., 20.00 w. microns.

EXAMPLE II 4-ethyl-1,6,6,9,9-pentamethyl-1,2,6,7,8,9-hexahydro-3H-benz(e)inden-3-one (a) 1.2 mole (126 g.) of crotonyl chloride is added over a period of 15 minutes to a suspension of 140 g. (1.05 moles) of anhydrous aluminum chloride in 450 ml. of ethylene chloride at 0°. Then 216 g. (1 mole) of 6-ethyl-1,1,4,4, tetramethyl-1,2,3,4-tetrahydronaphthalene in 250 ml. of ethylene dichloride is added during the course of 1.5 hours at 0 to −5°. Stirring is continued for 2 hours after the addition. The solution is quenched on ice and hydrochloric acid solution and the resulting ethylene dichloride solution separated and washed with water and sodium bicarbonate solution until neutrality.

The extract is filtered and distilled. After removal of solvent the residual oil is vacuum-distilled to yield an oil (150.5 g.), B.P. 155–163° (1 mm.). $N_D^{20}$ 1.5394. Recrystallization from ethanol gave 7-crotonyl-6 ethyl-1,1,4,4 - tetramethyl-1,2,3,4-tetrahydronaphthalene (114 g.) M.P. 37–38.5°. Calc. for $C_{20}H_{28}O$: C, 84.45; H, 9.92. Found: C, 85.45; H, 10.10.

(b) A portion (64 g.) of the above product is cyclized by heating in the presence of 800 g. of polyphosphoric acid first at 70° and finally at 105° over a 30-minute period. The batch is stirred and allowed to cool to 80° over a period of 20 minutes. After quenching in ice the product is extracted with toluene. The solution washed to neutrality sequentially with water and with 10% $NaHCO_3$ solution. The solvent is removed by distillation and the residual oil vacuum-distilled (B.P. 148–155° at 1 mm.) to yield an oil (52 g.). The oil is crystallized from ethanol to yield the desired 4-ethyl-1,6,6,9,9-pentamethyl-1,2,6,7,8,9-hexahydro-3H-benz(e)inden-3-one (25.5 g.) having a strong musk-like odor, M.P. 96°–97° C. Calc. for $C_{20}H_{28}O$: C, 84.45; H, 9.92. Found: C, 84.49; H, 9.96; mass spec. M.W. 284 (parent peak). N.M.R. analysis shows the following peaks:

| Multiplicity: | Tau values |
|---|---|
| Triplet $CH_3CH_2$ | 8.80 |
| Doublet $CH_3CH$ | 8.70 |
| Multiplet 4 t-methyls | 8.28, 8.39, 8.67 |
| Singlet —$(CH_2)_2$— | 8.28 |
| Doublet | 7.72 |
| Multiplet (doublet of doublets) $CH_2$ C=O | 7.18 |
| Quartet $\phi$ $CH_2CH_3$ | 6.98 |
| Multiplet H—C—$CH_3$ | 6.18 |
| Singlet $\phi$ H | 2.82 |

The infrared spectrum shows the following characteristic bands (KBr pellet, ca. 0.1 mm.): 3.32 ms., 3.38 s., 3.43 s., 3.53 s., 5.88 s., 5.92 s., 6.32 m., 6.45 s., 6.48 ms., 6.75 m., 6.85 s., 6.90 s., 705 m., 7.25 ms., 7.30 ms., 7.34 s., 7.60 ms., 7.73 m., 7.84 s., 8.15 ms., 8.27 m., 8.55 m., 8.60 m., 8.92 s., 9.22 ms., 9.50 ms., 9.50 ms., 9.90 m., 10.05 m., 10.32 w., 10.75 mw., 10.85 m., 11.32 m., 11.75 mw., 12.60 mw., 13.70 w., 14.30 w., 14.60 w., 15.60 m. microns.

EXAMPLE III

Cologne base formulation

A compound of Formula I was formulated to make a cologne base having the following composition:

|  | Parts |
|---|---|
| 1,4,6,6,7,9,9 - heptamethyl - 1,2,6,7,8,9-hexahydro-3H-benz(e)inden-3-one | 20 |
| Benzyl isoeugenol | 27 |
| Bergamot oil | 291 |
| Geranium oil | 10 |
| Lavender oil | 32 |
| Lemon oil | 283 |
| Lime oil | 54 |
| Neroli oil | 10 |
| Orange oil, bitter | 140 |
| Orange oil, sweet | 75 |
| Rosemary oil | 32 |
| Sage clary oil | 21 |
| Thyme oil, white | 5 |
|  | 1000 |

EXAMPLE IV

Musk-wood base formulation

A compound of Formula I was formulated to make a musk wood base of the following composition:

|  | Parts |
|---|---|
| 4 - ethyl - 1,6,6,9,9 - pentamethyl - 1,2,6,7,8,9-hexahydro-3H-benz(e)inden-3-one | 600 |
| Sandela GD* | 100 |
| Cedarwood oil | 100 |
| Patchouli oil | 20 |
| Labdanum oabsolute | 50 |
| Vetiver acetate | 100 |
| Galbanum soluble resin | 20 |
| Ylang bourbon | 10 |

*Registered trademark of Givaudan Corporation for polycyclic alcohol product having sandalwood odor

What is claimed is:

1. A compound of the formula:

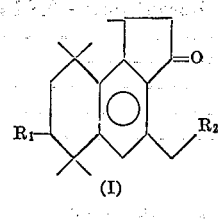

(I)

where $R_1$ and $R_2$ are hydrogen or methyl provided that where $R_2$ is hydrogen, $R_1$ is methyl and where $R_2$ is methyl, $R_1$ is hydrogen.

2. A compound of claim 1 wherein $R_1$ is hydrogen and $R_2$ is methyl.

3. A compound of claim 1 wherein $R_1$ is methyl and $R_2$ is hydrogen.

References Cited

UNITED STATES PATENTS 2,815,382   12/1957   Carpenter et al. ____ 260—590

HOWARD T. MARS, Primary Examiner

J. E. EVANS, Assistant Examiner

U.S. Cl. X.R.

252—522; 260—592